(12) United States Patent
Yang

(10) Patent No.: US 7,120,014 B2
(45) Date of Patent: Oct. 10, 2006

(54) PORTABLE HARD DISK CASING

(75) Inventor: Huan-Chang Yang, San Chung (TW)

(73) Assignee: Dynamic System Electronics Corp., Taipei Hsien (TW)

( * ) Notice: Subject to any disclaimer, the term of this patent is extended or adjusted under 35 U.S.C. 154(b) by 187 days.

(21) Appl. No.: 10/969,838

(22) Filed: Oct. 22, 2004

(65) Prior Publication Data

US 2006/0087808 A1 Apr. 27, 2006

(51) Int. Cl.
*G06F 1/16* (2006.01)
*F16B 12/00* (2006.01)
*H05K 5/00* (2006.01)

(52) U.S. Cl. ...................... 361/685; 312/111

(58) Field of Classification Search ............... 361/685; 312/111
See application file for complete search history.

(56) References Cited

U.S. PATENT DOCUMENTS

| 5,564,802 | A * | 10/1996 | Chiou ........................ 312/111 |
| 6,188,571 | B1 * | 2/2001 | Roganti et al. ............. 361/685 |
| 6,891,721 | B1 * | 5/2005 | Huang ........................ 361/685 |
| 6,992,885 | B1 * | 1/2006 | Wang ........................ 361/685 |
| 2002/0181198 | A1 * | 12/2002 | White et al. ................ 361/685 |
| 2005/0243506 | A1 * | 11/2005 | Robertson et al. .......... 361/685 |

* cited by examiner

*Primary Examiner*—Lisa Lea-Edmonds
(74) *Attorney, Agent, or Firm*—Rabin & Berdo, P.C.

(57) ABSTRACT

A portable hard disk casing includes a hollow body with a front opening, a rear opening and two pairs of guiding tracks each formed on an inner face of the hollow body to be opposite to each other, two carriers for carrying thereon a storing unit, each carrier having two coupling ribs respectively formed on a side of the carrier to be opposite to one another to correspond to and to be received in the guiding tracks of the hollow body, a front cover to connect to the hollow body to cover the front opening of the hollow body and a rear cover to connect to the hollow body to cover the rear opening of the hollow body such that the storing unit is enclosed in the portable hard disk casing.

17 Claims, 5 Drawing Sheets

PORTABLE HARD DISK CASING

BACKGROUND OF THE INVENTION

1. Field of the Invention

The present invention relates to a portable hard disk casing, and more particularly to the portable hard disk casing enabling the user to easily assemble the casing and maintain overall appearance of the portable hard disk casing.

2. Description of Related Art

A conventional hard disk casing normally is composed of a front cover, a rear cover, and a hollow body. After a storing unit is mounted on a face of the front cover or the rear cover, the front cover and the rear cover are assembled with two opposite sides of the hollow body. Another type of conventional portable hard disk casing is further provided with a carrier on which the storing unit is mounted. The carrier is then connected to the rear cover after the storing unit is secured. No matter what kind of structure of the conventional portable hard disk drive casing is, the weight of the storing unit will easily break the bonding with the rear cover due to torque between the rear cover and the storing unit. Furthermore, the conventional portable hard disk drive is not provided with a supporting device to stand the portable hard disk drive on a surface such that the operation of the hard disk is not convenient.

In order to overcome the aforementioned shortcomings, the present invention is to provide a portable hard disk casing that is easy for the user to assemble the storing unit inside the casing and does not worry about bonding breakage between the casing and the storing unit.

Other objects, advantages, and novel features of the invention will become more apparent from the following detailed description when taken in conjunction with the accompanying drawings.

SUMMARY OF THE INVENTION

The primary objective of the present invention is to provide an improved portable hard disk casing that is easy to be assembled.

Still another objective of the present invention is to provide a supporting plate to help stand the portable hard disk casing so as to facilitate the operation of the portable hard disk casing.

Other objects, advantages, and novel features of the invention will become more apparent from the following detailed description when taken in conjunction with the accompanying drawings.

DETAILED DESCRIPTION OF PREFERRED EMBODIMENT

Figure 1:
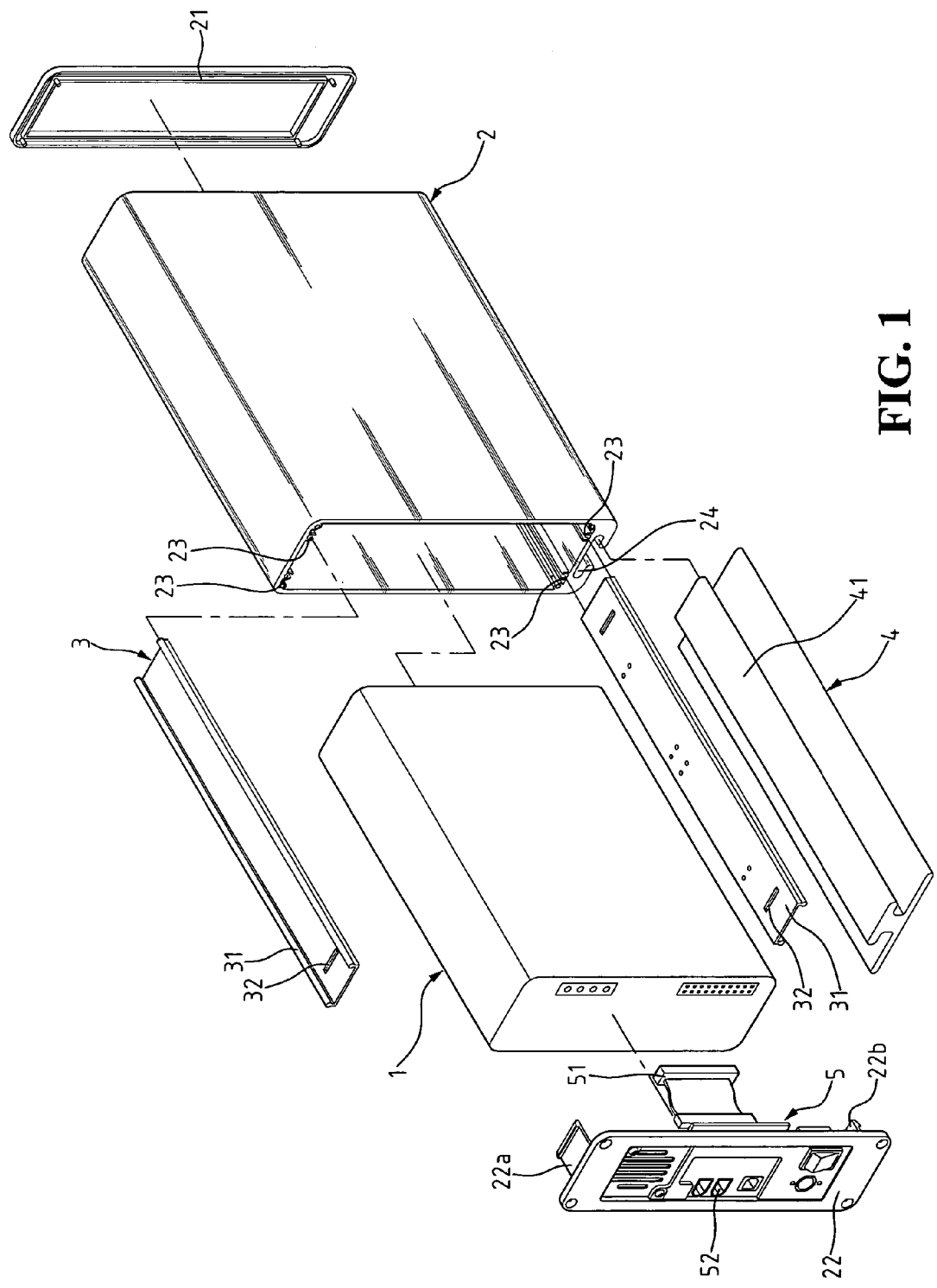
FIG. 1 is an exploded view of a portable hard disk casing in accordance with the present invention.
Figure 2:
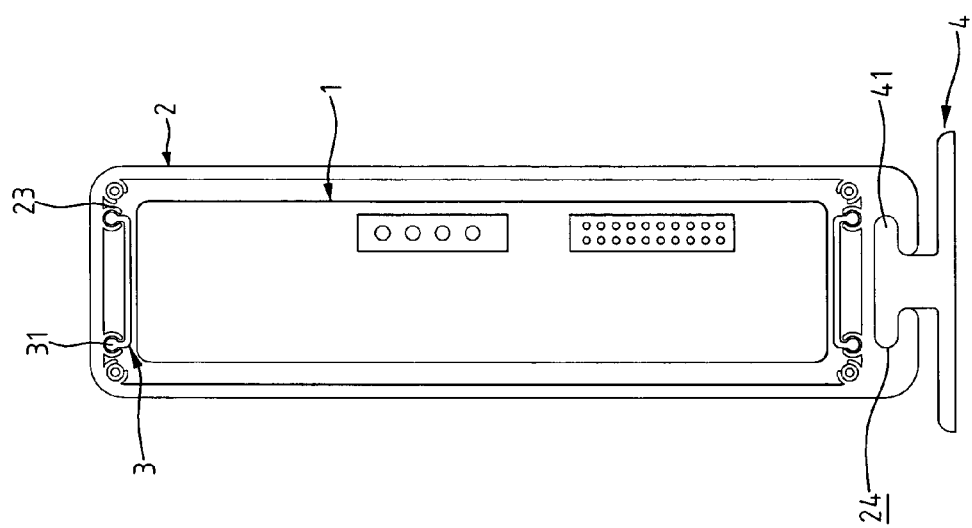
FIG. 2 is a rear plan view showing the portable hard disk casing after being assembled.
Figure 3:
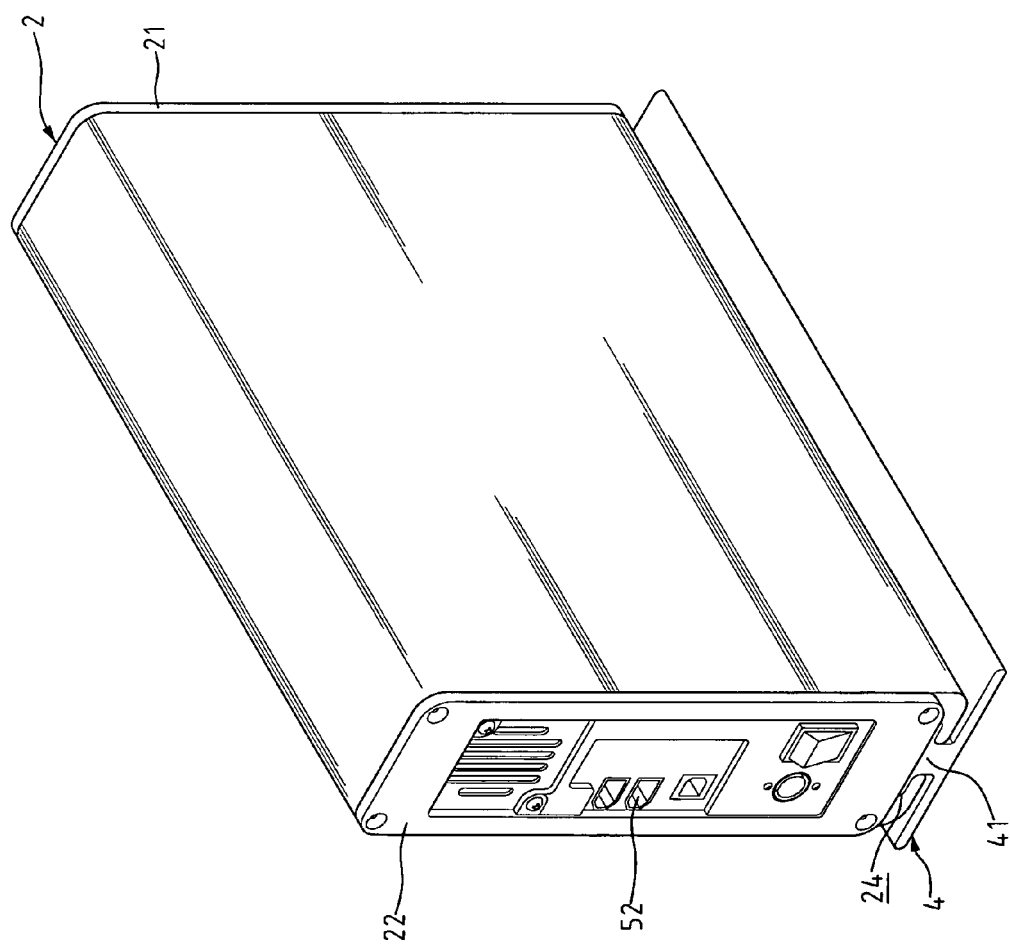
FIG. 3 is a perspective view showing the overall appearance of the portable hard disk casing after assembly.

With reference to FIGS. 1, 2 and 3, a portable hard disk casing constructed in accordance with the present invention comprises a hollow body 2 with two openings oppositely defined in the hollowing body 2, a front cover 21 to cover a front opening of the hollow body 2, a rear cover 22 to cover a rear opening of the hollow body 2, two carriers 3 and a supporting plate 4.

The hollow body 2 is provided with two pairs of longitudinally formed guiding tracks 23 each formed on an inner side of the hollow body 2 to be opposite to one another and a dovetailed recess 24 defined in an outer face of a bottom of the hollow body 2. The rear cover 22 is provided with a top ledge 22a and a bottom ledge 22b respectively formed on a top and a bottom of the rear cover 22. Furthermore, the rear cover 22 is provided with transmitting circuit board 5 having thereon a first transmitting connector 51 to be electrically connected to a storing unit 1 and to correspond to an Integrated Drive Electronic Interface (IDE) on the storing unit 1 for communication with such as a USB interface or an IEEE 1394 interface and a second transmitting connector 52 to be electrically connected to a computer main frame (not shown) such that the storing unit 1 is able to have communication with the computer main frame via the first transmitting connector 51 and the second transmitting connector 52.

Each carrier 3 is an elongated plate and provided with two longitudinally formed coupling ribs 31 each formed on a side of the carrier 3 to be opposite to one another and a slit 32 defined in a distal side face of the carrier 3.

The supporting plate 4 is provided with a dovetailed protrusion 41 formed on the supporting plate 4 to correspond to the dovetailed recess 24 of the hollow body 2 and a flat bottom face formed on a bottom of the supporting plate 4.

When the portable hard disk casing of the present invention is assembled, the storing unit 1 is first mounted on one of the carriers 3. Then the two carriers 3 are inserted into the hollow body 2 with the coupling ribs 31 of the carrier 3 to be received in the guiding tracks 23 in the hollow body 2. The front cover 21 is connected to the hollow body 2 to cover the front opening of the hollow body 2. The rear cover 22 is connected to the hollow body 2 to cover the rear opening of the hollow body 2 to allow the first transmitting connector 51 to electrically connect to the storing unit 1 and the top ledge 22a and the bottom ledge 22b to be received in the slits 32 of the two carriers 3. Finally the dovetailed protrusion 41 of the supporting plate 4 is inserted into the dovetailed recess 24 of the hollow body 2 so as to enable the hollow body 2 to stand itself.

Figure 4:
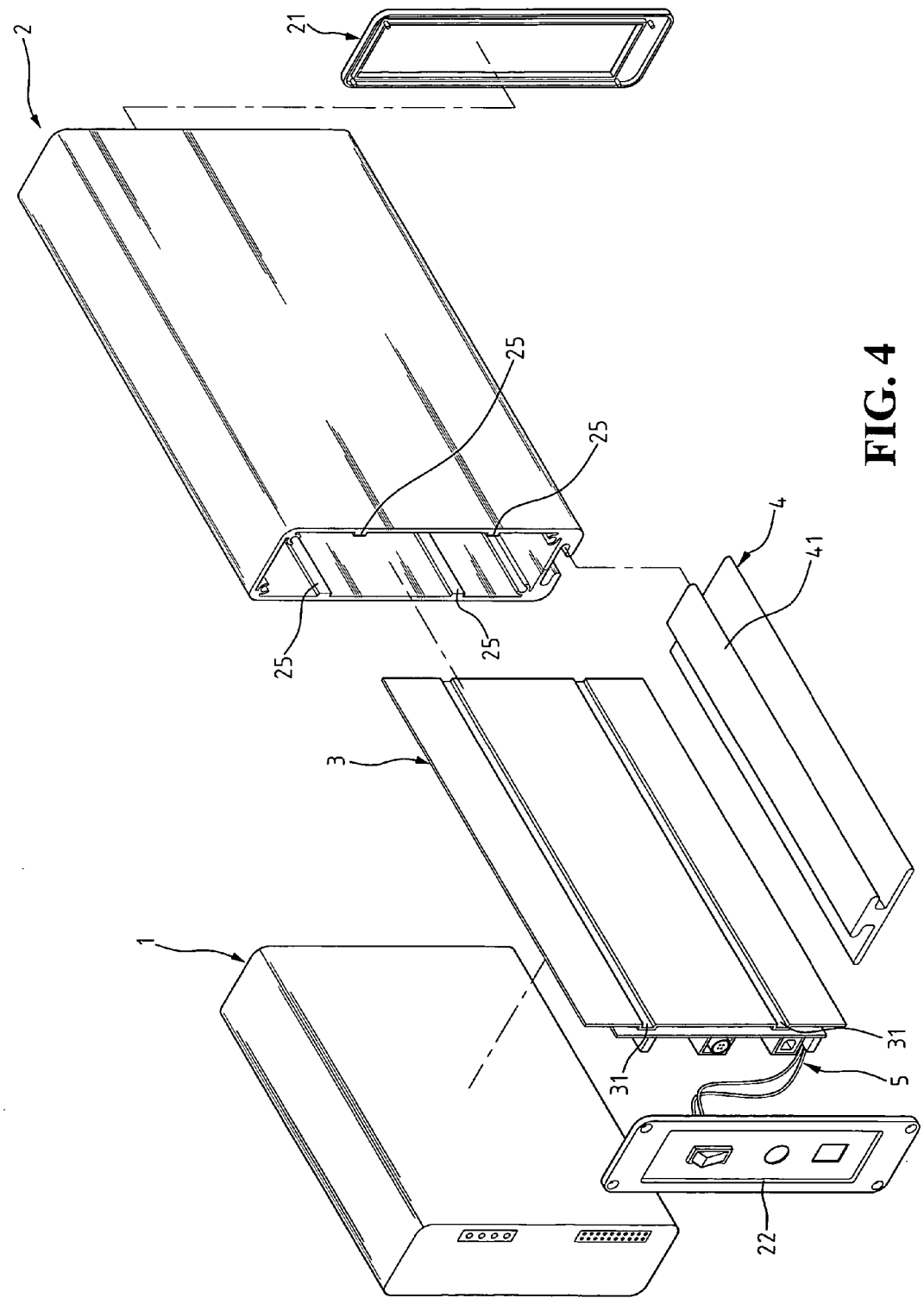
FIG. 4 is an exploded view of the portable hard disk casing of another embodiment of the present invention.
Figure 5:
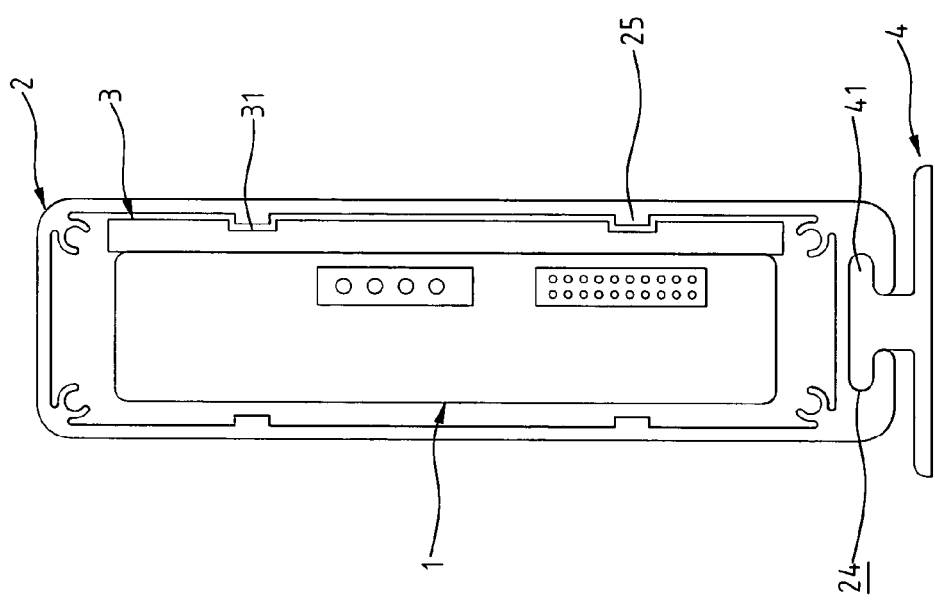
FIG. 5 is a rear plan view showing the assembled portable hard disk casing in FIG. 4.

With reference to FIGS. 4 and 5, the guiding tracks 23 in FIG. 1 may be formed on two opposite side face of the hollow body 2 to be designated with a reference numeral of 25 to correspond to the coupling ribs 31 of the carrier 3.

When the portable hard disk casing of the present invention is assembled, the storing unit 1 is first mounted on one of the carriers 3. Then the two carriers 3 are inserted into the hollow body 2 with the coupling ribs 31 of the carrier 3 to be received in the guiding tracks 25 in the hollow body 2. The front cover 21 is connected to the hollow body 2 to cover the front opening of the hollow body 2. The rear cover 22 is connected to the hollow body 2 to cover the rear opening of the hollow body 2. Finally the dovetailed protrusion 41 of the supporting plate 4 is inserted into the dovetailed recess 24 of the hollow body 2 so as to enable the hollow body 2 to stand itself.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable hard disk casing comprising:
   a hollow body defining front and rear openings and comprising two pairs of guiding tracks each formed on an inner face of the hollow body to be opposite to each other;
   two carriers for carrying thereon a storing unit, each carrier having two coupling ribs respectively formed on a side of the carrier to be opposite to one another to correspond to and to be received in the guiding tracks of the hollow body;
   a front cover to connect to the hollow body to cover the front opening of the hollow body; and
   a rear cover to connect to the hollow body to cover the rear opening of the hollow body such that the storing unit is enclosed in the portable hard disk casing.

2. The portable hard disk casing as claimed in claim 1, wherein each carrier is provided with a slit defined in a front end of the carrier and the rear cover has a top ledge and a bottom ledge to correspond to each slit of the two carriers so that the carriers are secured inside the hollow body.

3. The portable hard disk casing as claimed in claim 2, wherein the rear cover further has a first transmitting connector for electrical connection with the storing unit and a second transmitting connector for connection with a computer main frame.

4. The portable hard disk casing as claimed in claim 3, wherein the hollow body further has a dovetailed recess defined in a bottom of the hollow body to correspond to a dovetailed protrusion formed on a supporting plate such that after the dovetailed protrusion is received in the corresponding dovetailed recess, the hollow body is able to stand itself.

5. The portable hard disk casing as claimed in claim 4, wherein the coupling ribs are longitudinally formed to correspond to longitudinally formed guiding tracks such that the coupling ribs are receivable in the guiding tracks.

6. The portable hard disk casing as claimed in claim 3, wherein the coupling ribs are longitudinally formed to correspond to longitudinally formed guiding tracks such that the coupling ribs are receivable in the guiding tracks.

7. The portable hard disk casing as claimed in claim 2, wherein the hollow body further has a dovetailed recess defined in a bottom of the hollow body to correspond to a dovetailed protrusion formed on a supporting plate such that after the dovetailed protrusion is received in the corresponding dovetailed recess, the hollow body is able to stand itself.

8. The portable hard disk casing as claimed in claim 7, wherein the coupling ribs are longitudinally formed to correspond to longitudinally formed guiding tracks such that the coupling ribs are receivable in the guiding tracks.

9. The portable hard disk casing as claimed in claim 2, wherein the coupling ribs are longitudinally formed to correspond to longitudinally formed guiding tracks such that the coupling ribs are receivable in the guiding tracks.

10. The portable hard disk casing as claimed in claim 1, wherein the rear cover further has a first transmitting connector for electrical connection with the storing unit and a second transmitting connector for connection with a computer main frame.

11. The portable hard disk casing as claimed in claim 10, wherein the hollow body further has a dovetailed recess defined in a bottom of the hollow body to correspond to a dovetailed protrusion formed on a supporting plate such that after the dovetailed protrusion is received in the corresponding dovetailed recess, the hollow body is able to stand itself.

12. The portable hard disk casing as claimed in claim 11, wherein the coupling ribs are longitudinally formed to correspond to longitudinally formed guiding tracks such that the coupling ribs are receivable in the guiding tracks.

13. The portable hard disk casing as claimed in claim 10, wherein the coupling ribs are longitudinally formed to correspond to longitudinally formed guiding tracks such that the coupling ribs are receivable in the guiding tracks.

14. The portable hard disk casing as claimed in claim 1, wherein the hollow body further has a dovetailed recess defined in a bottom of the hollow body to correspond to a dovetailed protrusion formed on a supporting plate such that after the dovetailed protrusion is received in the corresponding dovetailed recess, the hollow body is able to stand itself.

15. The portable hard disk casing as claimed in claim 14, wherein the coupling ribs are longitudinally formed to correspond to longitudinally formed guiding tracks such that the coupling ribs are receivable in the guiding tracks.

16. The portable hard disk casing as claimed in claim 1, wherein the coupling ribs are longitudinally formed to correspond to longitudinally formed guiding tracks such that the coupling ribs are receivable in the guiding tracks.

17. The portable hard disk casing as claimed in claim 1, wherein the rear cover is provided with transmitting circuit board having thereon a first transmitting connector to be electrically connected to a storing unit and to correspond to an Integrated Drive Electronic Interface (IDE) on the storing unit for communication with such as a USB interface or an IEEE 1394 interface and a second transmitting connector for electrical connection to a computer main frame such that the storing unit is able to have communication with the computer main frame via the first transmitting connector and the second transmitting connector.

* * * * *